US011177904B2

(12) United States Patent
Zhang et al.

(10) Patent No.: US 11,177,904 B2
(45) Date of Patent: Nov. 16, 2021

(54) PHASE TRACKING REFERENCE SIGNAL INDICATION IN MULTI-USER SUPERPOSITION TRANSMISSION

(71) Applicant: Apple Inc., Cupertino, CA (US)

(72) Inventors: Yushu Zhang, Beijing (CN); Gang Xiong, Portland, OR (US); Alexei Davydov, Nizhny Novgorod (RU); Guotong Wang, Beijing (CN)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 16/478,813

(22) PCT Filed: Mar. 22, 2018

(86) PCT No.: PCT/US2018/000092
§ 371 (c)(1),
(2) Date: Jul. 17, 2019

(87) PCT Pub. No.: WO2018/164761
PCT Pub. Date: Sep. 13, 2018

(65) Prior Publication Data
US 2019/0379481 A1 Dec. 12, 2019

(30) Foreign Application Priority Data
Feb. 17, 2017 (WO) .............. PCT/CN2017/073928

(51) Int. Cl.
*H04L 1/00* (2006.01)
*H04L 5/00* (2006.01)
*H04W 72/04* (2009.01)

(52) U.S. Cl.
CPC ............ *H04L 1/001* (2013.01); *H04L 5/0007* (2013.01); *H04W 72/042* (2013.01)

(58) Field of Classification Search
CPC ..... H04L 1/001; H04L 5/0001; H04L 5/0007; H04W 72/04
See application file for complete search history.

(56) References Cited

U.S. PATENT DOCUMENTS

2016/0309542 A1* 10/2016 Kowalski ............ H03M 13/353
2016/0337879 A1* 11/2016 Hwang .............. H04W 72/1231
2016/0366003 A1* 12/2016 Kwon ..................... H04L 5/003
(Continued)

OTHER PUBLICATIONS

International Search Report and Written Opinion for International Patent Application No. PCT/US2018/000092, dated Jun. 7, 2018.
(Continued)

*Primary Examiner* — Kent Krueger
(74) *Attorney, Agent, or Firm* — Sterne, Kessler, Goldstein & Fox P.L.L.C.

(57) ABSTRACT

Described is an apparatus of an Evolved Node-B (eNB) operable to communicate with a User Equipment (UE) on a wireless network. The apparatus may comprise a first circuitry and a second circuitry. The first circuitry may be operable to determine a presence of a Phase Tracking Reference Signal (PT-RS) and a density of the PT-RS. The second circuitry may be operable to process the PT-RS. The second circuitry may also be operable to process a transmission in a Multi-User Superposition Transmission (MUST) operation in accordance with the PT-RS.

24 Claims, 10 Drawing Sheets

800

(56) References Cited

U.S. PATENT DOCUMENTS

| | | |
|---|---|---|
| 2016/0374060 A1 | 12/2016 | Lim et al. |
| 2017/0331662 A1* | 11/2017 | Sun ...................... H04L 27/362 |
| 2018/0027441 A1* | 1/2018 | Kim ................... H04W 52/243 370/311 |
| 2018/0110017 A1* | 4/2018 | Jha ....................... H04L 1/0005 |
| 2018/0278301 A1* | 9/2018 | Kim ................... H04W 72/085 |
| 2018/0359123 A1* | 12/2018 | Kimura ............ H04L 25/03343 |
| 2019/0173652 A1* | 6/2019 | Fehrenbach ........ H04L 25/0204 |
| 2019/0305877 A1* | 10/2019 | Lee ....................... H04W 74/08 |
| 2020/0052930 A1* | 2/2020 | Kim ................... H04L 25/0226 |

OTHER PUBLICATIONS

3GPP, "Study on Downlink Multiuser Superposition Transmission (MUST) for LTE", TR 36.859, V13.0.0 (2016).

CMCC, "Phase-Tracking Reference Signal Design for High-Frequency Systems", 3GPP Draft; R1-1703406, vol. RAN WG1, Athens, Greece, Feb. 12, 2017.

Mediatek, Inc.,"Multiuser Superposition Tranmission Scheme for LTE", 3GPP Draft; R1-154454, vol. RAN WG1, Beijing, China, Aug. 23, 2015.

International Preliminary Report on Patentability for PCT Application No. PCT/US2018/000092, dated Aug. 29, 2019.

* cited by examiner

PHASE TRACKING REFERENCE SIGNAL INDICATION IN MULTI-USER SUPERPOSITION TRANSMISSION

CLAIM OF PRIORITY

The present application is a National Stage Entry of, and claims priority to, PCT Application No. PCT/US2018/000092, filed on Feb. 20, 2018, and titled "PHASE TRACKING REFERENCE SIGNAL INDICATION IN MULTI-USER SUPERPOSITION TRANSMISSION," which claims priority under 35 U.S.C. § 365(c) to Patent Cooperation Treaty International Patent Application Number PCT/CN2017/073928 filed Feb. 17, 2017, both of which are herein incorporated by reference in their entirety.

BACKGROUND

A variety of wireless cellular communication systems have been implemented, including 3rd Generation Partnership Project (3GPP) Universal Mobile Telecommunications Systems, 3GPP Long-Term Evolution (LTE) systems, 3GPP LTE-Advanced (LTE-A) systems. Next-generation wireless cellular communication systems based upon LTE and LTE-A systems are being developed, such as a fifth generation (5G) wireless systems/5G mobile networks system.

Next-generation wireless cellular communication systems may provide for Multi-User Superposition Transmission (MUST) for improved Downlink performance.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced (LTE-A) systems, and 5th Generation (5G) wireless systems/5G mobile networks systems/5G New Radio (NR) systems.

Phase noise may be more significant for 5G system operation in high-frequency bands (e.g., frequencies at above approximately 6 gigahertz (GHz)) than for 5G system operation in low-frequency bands. The phase noise may contribute to or cause common phase error (CPE), inter-carrier interference (ICI), or both. CPE may comprise a common phase shift for all subcarriers in the same symbol, which may ultimately be a dominant impact of phase noise.

A Phase Tracking Reference Signal (PT-RS) may be used to compensate for the CPE. However, for some modulation schemes such as Quadrature Phase-Shift Keying (QPSK), the impact of CPE may not be significant. In such cases, to save overhead, the PT-RS might not be used (e.g., for small modulation order scenarios). Accordingly, one possible way to determine the presence of PT-RS may be based on a Modulation and Coding Scheme (MCS).

Figure 1:
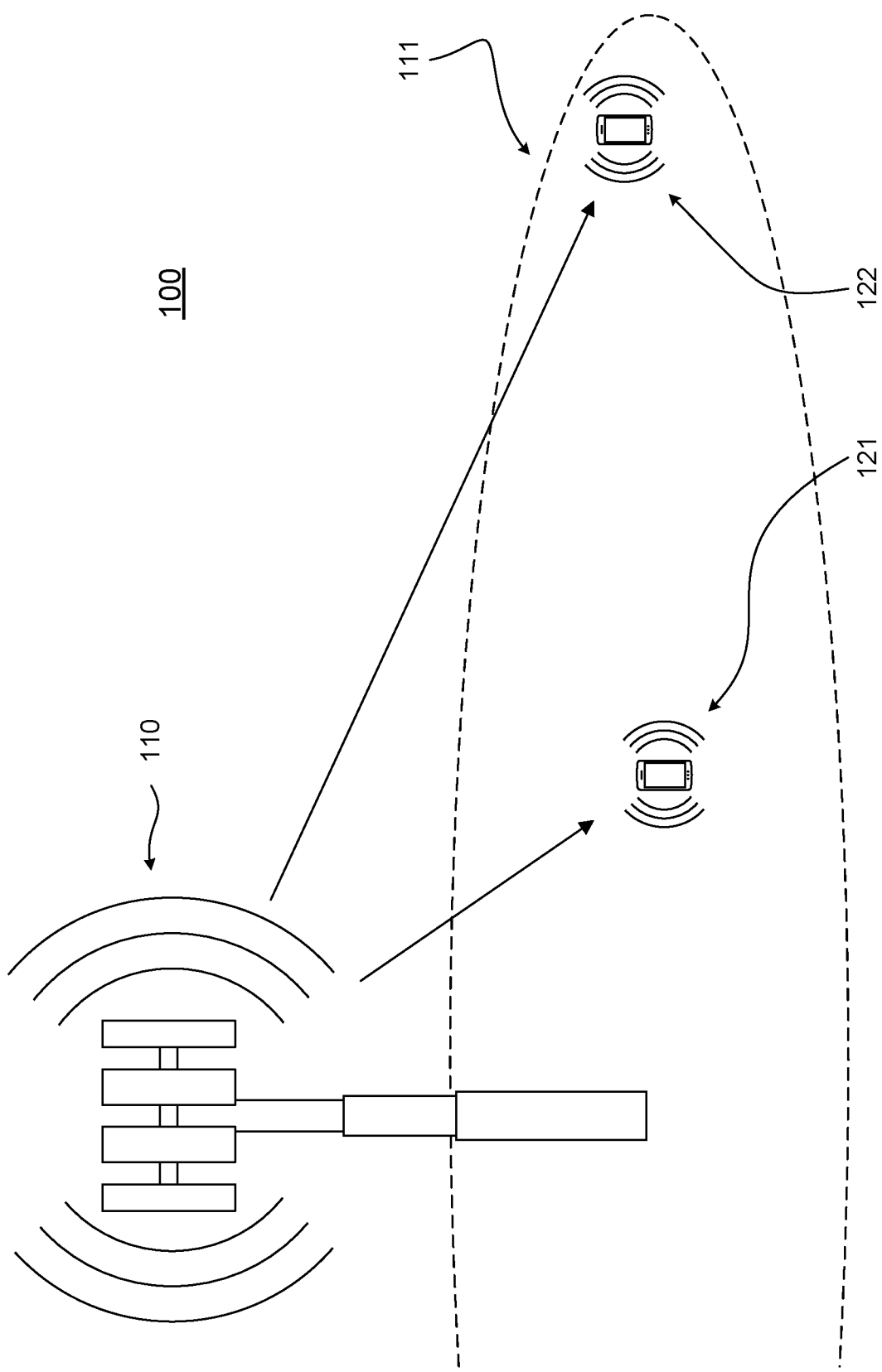
FIG. 1 illustrates a scenario of an Evolved Node-B (eNB) in wireless communication with a first User Equipment (UE) and a second UE, in accordance with some embodiments of the disclosure.

For Multi-User Superposition Transmission (MUST), two UEs in the same direction, or in a similar direction, may be transmitted to simultaneously within the same physical resources. FIG. 1 illustrates a scenario of an Evolved Node-B (eNB) in wireless communication with a first User Equipment (UE) and a second UE, in accordance with some embodiments of the disclosure. A scenario 100 may comprise an eNB 110 serving a cell 111, as well as a first UE 121 and a second UE 122. First UE 121 may be a Near-UE (e.g., first UE 121 may be positioned close to, or closer to, a central area of cell 111), while second UE 122 may be a Far-UE (e.g., second UE 122 may be positioned far from, or further away from, the central area of cell 111, such as by being positioned in an edge area of cell 111).

The UE with a high Signal-to-Interference-Plus-Noise Ratio (SINR) may be considered to be a Near-UE, and the UE with a low SINR may be considered to be a Far-UE. Accordingly, first UE 121 may have a higher SINR than second UE 122.

Figure 2:
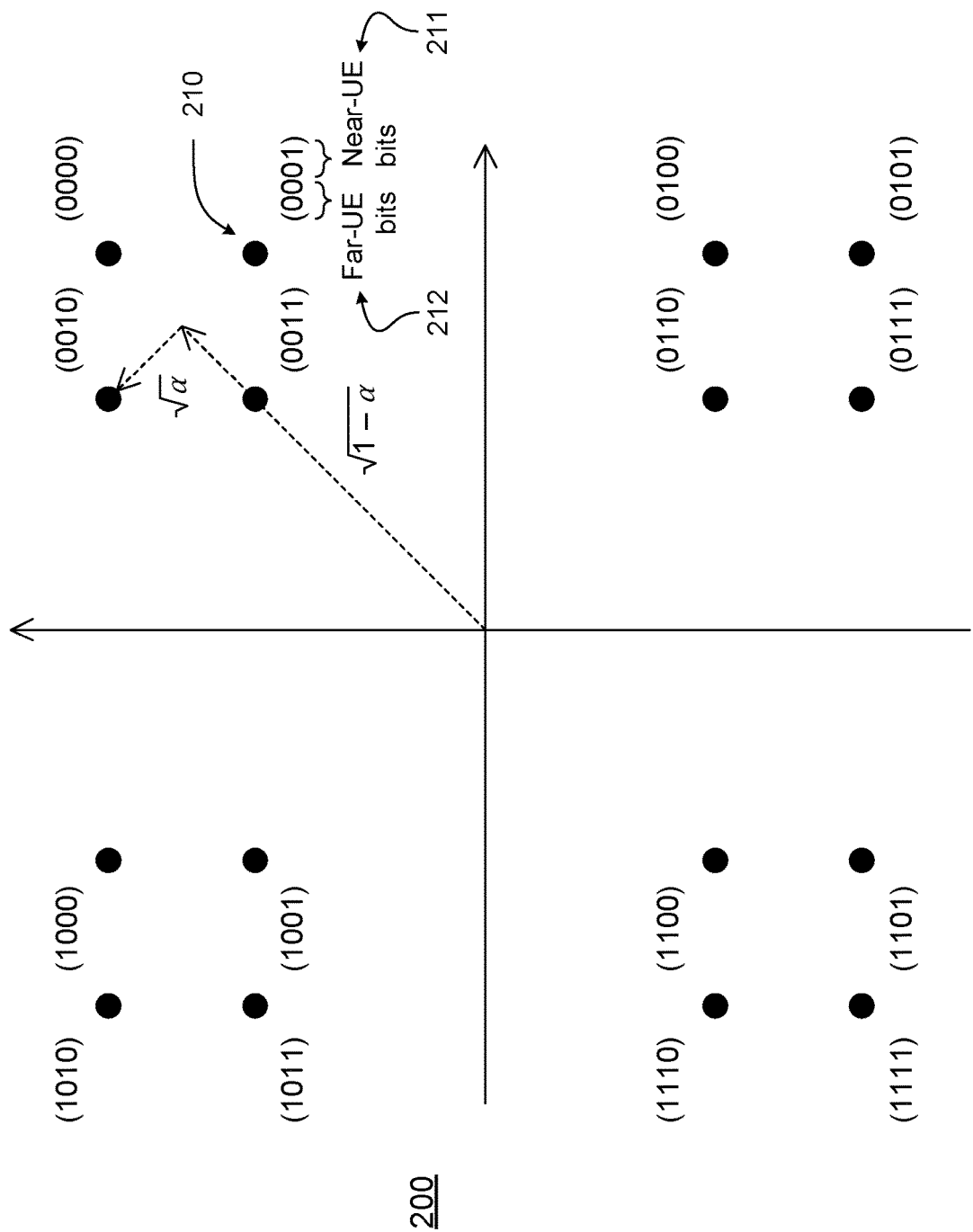
FIG. 2 illustrates a constellation for Multi-User Superposition Transmission (MUST), in accordance with some embodiments of the disclosure.

FIG. 2 illustrates a constellation for MUST, in accordance with some embodiments of the disclosure. A constellation 200 may comprise a plurality of points 210. In turn, each point 210 may correspond to a multiple-bit designation (e.g., a four-bit designation), in which a first portion of the designation may correspond with a Near-UE (e.g., first UE 121), and a second portion of the designation may correspond with a Far-UE (e.g., second UE 122). Accordingly, the first portion of the designation may comprise a first set of bits 211 corresponding with the Near-UE, and the second portion of the designation may comprise a second set of bits 212 corresponding with the Far-UE.

In various embodiments, a Far-UE might assume that QPSK modulation is used. However, the exact modulation order may be close to 16 Quadrature Amplitude Modulation (16-QAM) if an amplitude weight alpha is not small. Such embodiments may be disposed to employing a process of determining the presence of PT-RS and a pattern for the MUST case.

Disclosed herein are various mechanisms and methods for determining a PT-RS presence, and determining corresponding frequency/time patterns for MUST UEs. In some embodiments, PT-RS presence and/or corresponding frequency/time patterns may be based at least partially on an MCS as well as an amplitude weight (e.g., an amplitude weight alpha).

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, a centimeter-wave (cmWave) capable eNB or a cmWave small cell, a millimeter-wave (mmWave) capable eNB or an mmWave small cell, an Access Point (AP), and/or another base station for a wireless communication system. The term "gNB" may refer to a 5G-capable or NR-capable eNB. For purposes of the present disclosure, the term "UE" may refer to a legacy LTE capable User Equipment (UE), an mmWave capable UE, a cmWave capable UE, a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

A Near-UE may be capable of knowing an exact modulation order. In contrast, a Far-UE might not be capable of knowing the exact modulation order. Accordingly, it may be easy for a Far-UE to determine a presence and/or pattern for the PT-RS based merely on MCS. As shown in FIG. 2, the Far-UE might merely determine that QPSK is used, or may otherwise consider QPSK to be used, in which case a PT-RS might not be used. However, in cases in which a high modulation order is employed (e.g., 16-QAM), a use of a PT-RS may be advantageous.

Various embodiments may pertain to determining the use and/or presence of PT-RS. For various embodiments, if a UE is established as a Far-UE, transmission of a PT-RS may be assumed.

In some embodiments, a Far-UE indicator may be added in Downlink Control Information (DCI) which may tell the UE whether or not it is a Far-UE in MUST. For example, a Far-UE indicator may include one bit, for which a first value (e.g., a value of "0") may indicate that UE is not a Far-UE in MUST, and a second value (e.g., a value of "1") may indicate that the UE is a Far-UE in MUST.

For some high-modulation orders, such as 16-QAM, a PT-RS may be always transmitted. Accordingly, a Far-UE indicator may be jointly coded with an MCS indicator. For small-modulation orders, there may be two states: one state for the Far-UE case, and another state for a normal case (e.g., a Near-UE case, in some embodiments). For example, if it is assumed that no PT-RS may be transmitted for modulation orders of QPSK and below, and that PT-RS may be transmitted for modulation orders of 16-QAM and above, an MCS may be jointly coded with a Far-UE state, as indicated in Table 1 below.

TABLE 1 jointly coded MCS and Far-UE state

| MCS | ITBS | Modulation Scheme | Far-UE state |
|---|---|---|---|
| ... | ... | ... | ... |
| x | t | QPSK | no |
| x + 1 | t | QPSK | yes |
| x + 2 | t1 | QPSK | no |
| x + 3 | t1 | QPSK | yes |
| ... | ... | ... | ... |
| y | u | 16-QAM | — |
| y + 1 | u1 | 16-QAM | — |
| ... | ... | ... | ... |

For some embodiments, a CCE index or search space when the UE is a Far-UE may be different from a CCE index or search space when the UE is not a Far-UE. A UE may then determine whether or not it is a Far-UE based on the CCE index or search space.

Alternatively, in some embodiments, a scrambling parameter used to generate a Demodulation Reference Signal (DM-RS) for a Physical Downlink Control Channel (PDCCH) may be determined based on whether or not the UE is a Far-UE (e.g., based on a Far-UE state). For example, if the UE is Far-UE (e.g., based on a Far-UE state), a scrambling parameter k may be used for DM-RS generation, and if the UE is not a Far-UE (e.g., based on a Far-UE state), a scrambling parameter k+k0 may be used for DM-RS generation.

For some embodiments, a PT-RS for some Far-UEs may not be necessary if an amplitude weight alpha is small, and the amplitude weight alpha may accordingly be transmitted by DCI (e.g., carried by a DCI transmission). In some embodiments, there may be an amplitude weight set (which may be pre-defined or otherwise predetermined, or may be configured via higher-layer signaling). In some embodiments, an amplitude weight index informing the UE of the exact value of alpha may be added to the DCI. There may be a pre-defined or otherwise predetermined amplitude weight set in the DCI, and an amplitude weight index may be used to represent the various value of the weight set.

For example, for a weight set of {0, 0.1, 0.25, 0.5}, a two-bit amplitude weight index may represent the various values of the weight set, and a first value (e.g., a value of "00") may indicate that the UE is not a Far-UE. In some embodiments, the presence of PT-RS may then be determined by the value of the amplitude weight index as well as the MCS. The presence may be determined in accordance with a rule that may be pre-defined or otherwise predetermined, or may be configured by higher-layer signaling.

In some embodiments, there might not be an indication of a presence of PT-RS. A UE with a small modulation order may then use blind decoding to detect whether PT-RS has been transmitted. When the UE is a Far-UE, and alpha is not small, PT-RS may be transmitted. Accordingly, a UE may be disposed to employ blind-decoding to detect whether the PT-RS has been transmitted before decoding the data.

Various embodiments may pertain to determining a time and/or frequency pattern of PT-RS. In some embodiments, an MCS may be used to determine a time and/or frequency pattern (since the MCS may reflect a Signal-to-Noise Ratio (SNR) level). However, for a Near-UE and a Far-UE, the MCS might not perfectly reflect a real SNR level.

In some embodiments, an MCS or SNR offset may be added in the DCI. When determining a presence of PT-RS and a time and/or frequency pattern of the PT-RS, the UE may then acquire a more-exact MCS or SNR. For some embodiments, the MCS or NSR offset may be used for both a Far-UE and a Near-UE.

For some embodiments, there may be a number N of MCS or SNR thresholds that may be predetermined or otherwise pre-defined, or may be configured via higher-layer signaling. When an MCS or SNR that is calculated or estimated based on MCS and an MCS or SNR offset is below a first MCS or SNR threshold (e.g., a threshold having an index of "0"), there may be no PT-RS. When the MCS or SNR is within a range between a threshold k and a threshold k+1, a PT-RS pattern k may be assumed, which may be predetermined or otherwise pre-defined, or may be configured via higher-layer signaling. To calculate the SNR, a predetermined or otherwise pre-defined MCS to SNR mapping table, or a configured MCS to SNR mapping table, may be used.

Figure 3:
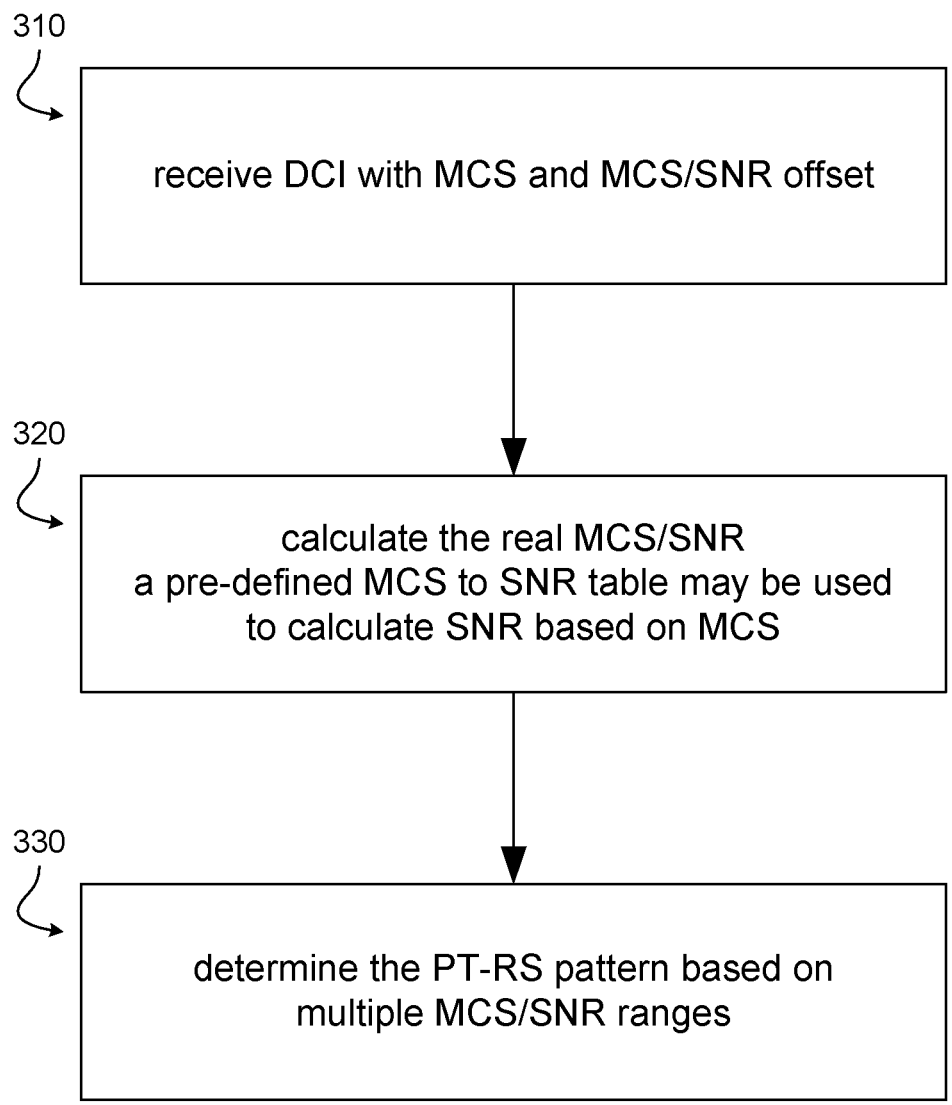
FIG. 3 illustrates a procedure for determining Phase Tracking Reference Signal (PT-RS), in accordance with some embodiments of the disclosure.

FIG. 3 illustrates a procedure for determining PT-RS, in accordance with some embodiments of the disclosure. A procedure 300 may comprise a first portion 310, a second portion 320, and a third portion 330.

In first portion 310, a UE may receive a DCI with MCS and/or an MCS or SNR offset. In second portion 320, the UE may calculate a real MCS/SNR. A predetermined or otherwise pre-defined MCS to SNR table may be used to calculate SNR based on MCS. In third portion 330, the UE may determine the PT-RS pattern based upon one or more MCS/SNR ranges.

Figure 4:
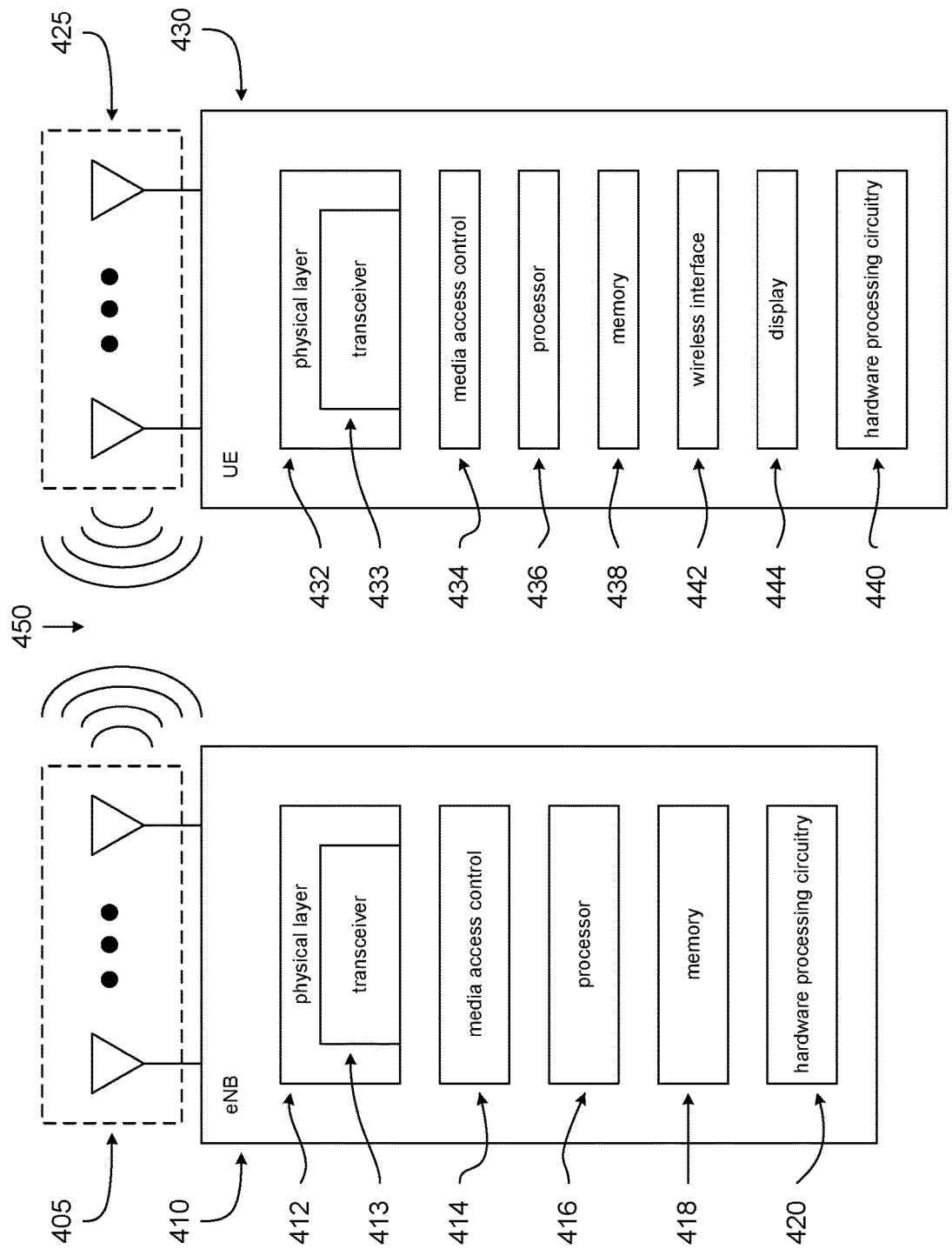
FIG. 4 illustrates an eNB and a UE, in accordance with some embodiments of the disclosure.

FIG. 4 illustrates an eNB and a UE, in accordance with some embodiments of the disclosure. FIG. 4 includes block diagrams of an eNB 410 and a UE 430 which are operable to co-exist with each other and other elements of an LTE network. High-level, simplified architectures of eNB 410 and UE 430 are described so as not to obscure the embodiments. It should be noted that in some embodiments, eNB 410 may be a stationary non-mobile device.

eNB 410 is coupled to one or more antennas 405, and UE 430 is similarly coupled to one or more antennas 425. However, in some embodiments, eNB 410 may incorporate or comprise antennas 405, and UE 430 in various embodiments may incorporate or comprise antennas 425.

In some embodiments, antennas 405 and/or antennas 425 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 405 are separated to take advantage of spatial diversity.

eNB 410 and UE 430 are operable to communicate with each other on a network, such as a wireless network. eNB 410 and UE 430 may be in communication with each other over a wireless communication channel 450, which has both a downlink path from eNB 410 to UE 430 and an uplink path from UE 430 to eNB 410.

As illustrated in FIG. 4, in some embodiments, eNB 410 may include a physical layer circuitry 412, a MAC (media access control) circuitry 414, a processor 416, a memory 418, and a hardware processing circuitry 420. A person skilled in the art will appreciate that other components not shown may be used in addition to the components shown to form a complete eNB.

In some embodiments, physical layer circuitry 412 includes a transceiver 413 for providing signals to and from UE 430. Transceiver 413 provides signals to and from UEs or other devices using one or more antennas 405. In some embodiments, MAC circuitry 414 controls access to the wireless medium. Memory 418 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 420 may comprise logic devices or circuitry to perform various operations. In some embodiments, processor 416 and memory 418 are arranged to perform the operations of hardware processing circuitry 420, such as operations described herein with reference to logic devices and circuitry within eNB 410 and/or hardware processing circuitry 420.

Accordingly, in some embodiments, eNB 410 may be a device comprising an application processor, a memory, one or more antenna ports, and an interface for allowing the application processor to communicate with another device.

As is also illustrated in FIG. 4, in some embodiments, UE 430 may include a physical layer circuitry 432, a MAC circuitry 434, a processor 436, a memory 438, a hardware processing circuitry 440, a wireless interface 442, and a display 444. A person skilled in the art would appreciate that other components not shown may be used in addition to the components shown to form a complete UE.

In some embodiments, physical layer circuitry 432 includes a transceiver 433 for providing signals to and from eNB 410 (as well as other eNBs). Transceiver 433 provides signals to and from eNBs or other devices using one or more antennas 425. In some embodiments, MAC circuitry 434 controls access to the wireless medium. Memory 438 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 442 may be arranged to allow the processor to communicate with another device. Display 444 may provide a visual and/or tactile display for a user to interact with UE 430, such as a touch-screen display. Hardware processing circuitry 440 may comprise logic devices or circuitry to perform various operations. In some embodiments, processor 436 and memory 438 may be arranged to perform the operations of hardware processing circuitry 440, such as operations described herein with reference to logic devices and circuitry within UE 430 and/or hardware processing circuitry 440.

Accordingly, in some embodiments, UE 430 may be a device comprising an application processor, a memory, one or more antennas, a wireless interface for allowing the application processor to communicate with another device, and a touch-screen display.

Elements of FIG. 4, and elements of other figures having the same names or reference numbers, can operate or function in the manner described herein with respect to any such figures (although the operation and function of such elements is not limited to such descriptions). For example, FIGS. 5-6 and 9-10 also depict embodiments of eNBs, hardware processing circuitry of eNBs, UEs, and/or hardware processing circuitry of UEs, and the embodiments described with respect to FIG. 4 and FIGS. 5-6 and 9-10 can operate or function in the manner described herein with respect to any of the figures.

In addition, although eNB 410 and UE 430 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 5:
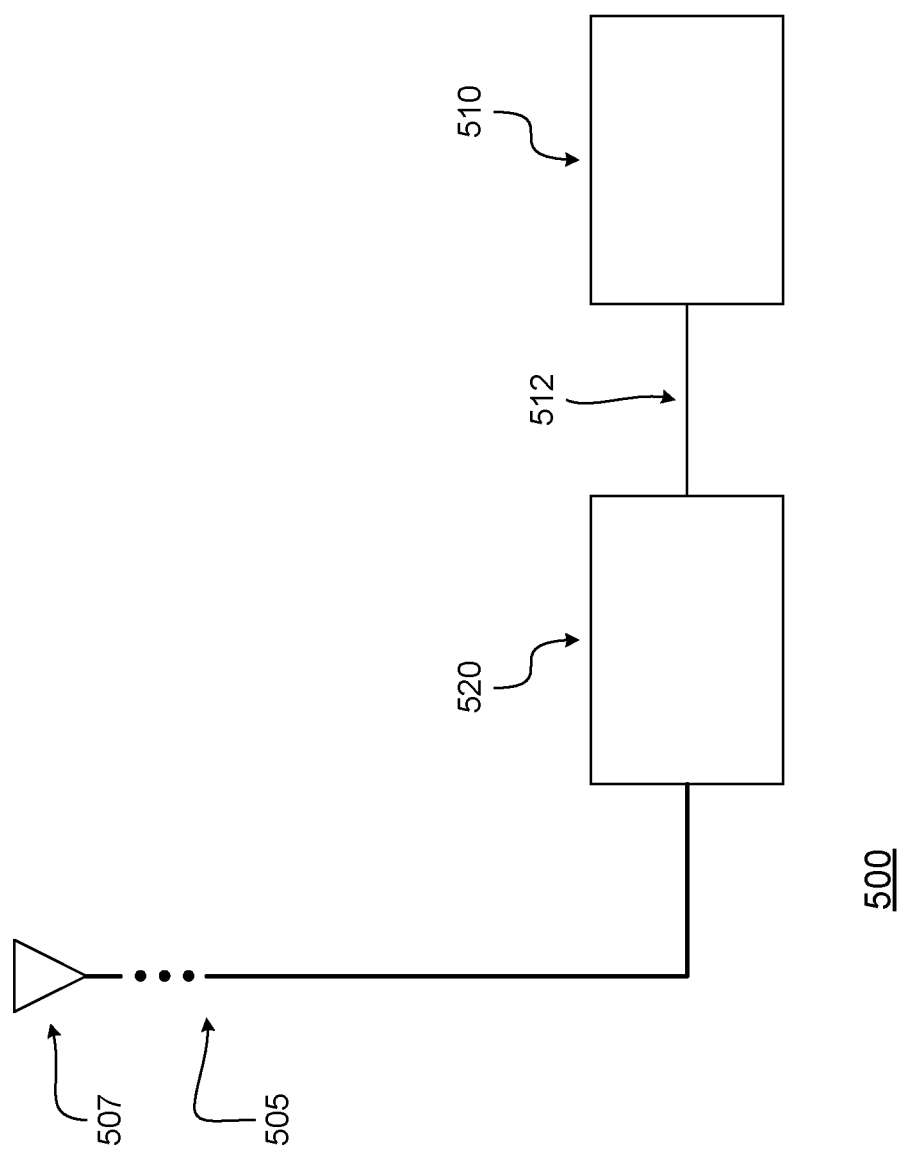
FIG. 5 illustrates hardware processing circuitries for a UE for determining a PT-RS presence, in accordance with some embodiments of the disclosure.

FIG. 5 illustrates hardware processing circuitries for a UE for determining a PT-RS presence, in accordance with some embodiments of the disclosure. With reference to FIG. 4, a UE may include various hardware processing circuitries discussed herein (such as hardware processing circuitry 500 of FIG. 5), which may in turn comprise logic devices and/or circuitry operable to perform various operations. For example, in FIG. 4, UE 430 (or various elements or components therein, such as hardware processing circuitry 440, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 436 (and/or one or more other processors which UE 430 may comprise), memory 438, and/or other elements or components of UE 430 (which may include hardware processing circuitry 440) may be arranged to perform the operations of these hardware processing circuitries, such as operations described herein with reference to devices and circuitry within these hardware processing circuitries. In some embodiments, processor 436 (and/or one or more other processors which UE 430 may comprise) may be a baseband processor.

Returning to FIG. 5, an apparatus of UE 430 (or another UE or mobile handset), which may be operable to communicate with one or more eNBs on a wireless network, may comprise hardware processing circuitry 500. In some embodiments, hardware processing circuitry 500 may comprise one or more antenna ports 505 operable to provide various transmissions over a wireless communication channel (such as wireless communication channel 450). Antenna ports 505 may be coupled to one or more antennas 507 (which may be antennas 425). In some embodiments, hardware processing circuitry 500 may incorporate antennas 507, while in other embodiments, hardware processing circuitry 500 may merely be coupled to antennas 507.

Antenna ports 505 and antennas 507 may be operable to provide signals from a UE to a wireless communications channel and/or an eNB, and may be operable to provide signals from an eNB and/or a wireless communications channel to a UE. For example, antenna ports 505 and antennas 507 may be operable to provide transmissions from UE 430 to wireless communication channel 450 (and from there to eNB 410, or to another eNB). Similarly, antennas 507 and antenna ports 505 may be operable to provide transmissions from a wireless communication channel 450 (and beyond that, from eNB 410, or another eNB) to UE 430.

Hardware processing circuitry 500 may comprise various circuitries operable in accordance with the various embodiments discussed herein. With reference to FIG. 5, hardware processing circuitry 500 may comprise a first circuitry 510 and/or a second circuitry 520.

In various embodiments, first circuitry 510 may be operable to determine a presence of a PT-RS and a density of the PT-RS. A density of the PT-RS may be a density or concentration of PT-RS in a set of time resources and/or a set of frequency resources, such as a density or concentration of REs carrying PT-RS in a set of OFDM symbols, subcarrier frequencies, and/or PRBs. Second circuitry 520 may be operable to process the PT-RS. In some embodiments, second circuitry 520 may analyze the PT-RS, and/or determine one or more of a CPE, an ICI, and/or a phase noise of the PT-RS. Second circuitry 520 may also be operable to process a transmission in a MUST operation in accordance with the PT-RS. In some embodiments, second circuitry 520 may use a CPE, an ICI, and/or a phase noise determined by processing the PT-RS to compensate for a CPE, an ICI, and/or a phase noise of the transmission in the MUST operation. First circuitry 510 may be operable to provide information regarding the presence and/or density of the PT-RS to second circuitry 520 via an interface 512. Hardware processing circuitry 500 may also comprise an interface for receiving the PT-RS and the transmission in the MUST operation from a receiving circuitry.

In a variety of embodiments, at least one of the presence of the PT-RS and the density of the PT-RS may be determined at least in part by a Far-UE indicator. In some embodiments, the Far-UE indicator may be carried by a DCI transmission and/or a higher-layer signaling transmission. For some embodiments, the Far-UE indicator may be jointly coded with an MCS indicator. In some embodiments, the MCS indicator may be carried by a DCI transmission. For some embodiments, the Far-UE indicator may be determined based upon a search space indicator. In some embodiments, the search space indicator may be a CCE index. For some embodiments, the Far-UE indicator may be determined based upon a DM-RS scrambling.

In a variety of embodiments, second circuitry 520 may also be operable to process a DCI transmission carrying an amplitude weight alpha indicator for PT-RS. For some embodiments, at least one of the presence of the PT-RS and the density of the PT-RS may be determined based upon the amplitude weight alpha indicator for PT-RS. In some embodiments, at least one of the presence of the PT-RS and the density of the PT-RS may be determined at least in part by a Far-UE indicator. The Far-UE indicator may be determined based upon the amplitude weight alpha indicator for PT-RS.

In a variety of embodiments, second circuitry 520 may also be operable to process a DCI transmission carrying an MCS or SNR offset. In some embodiments, at least one of the presence of the PT-RS and the density of the PT-RS may be determined at least in part by the MCS or SNR offset. For some embodiments, at least one of a PT-RS time pattern and a PT-RS frequency pattern may be determined at least in part by the MCS or SNR offset. In some embodiments, one or more of a PT-RS time pattern and a PT-RS frequency pattern may be determined at least in part by a range of offsets into which the MCS or SNR offset falls. For some embodiments, the range of offsets may be carried by a higher-layer signaling transmission. In some embodiments, one or more of the PT-RS time pattern and the PT-RS frequency pattern may be predetermined, or carried by a higher-layer signaling transmission.

In some embodiments, first circuitry 510 and/or second circuitry 520 may be implemented as separate circuitries. In other embodiments, first circuitry 510 and/or second circuitry 520 may be combined and implemented together in a circuitry without altering the essence of the embodiments.

Figure 6:
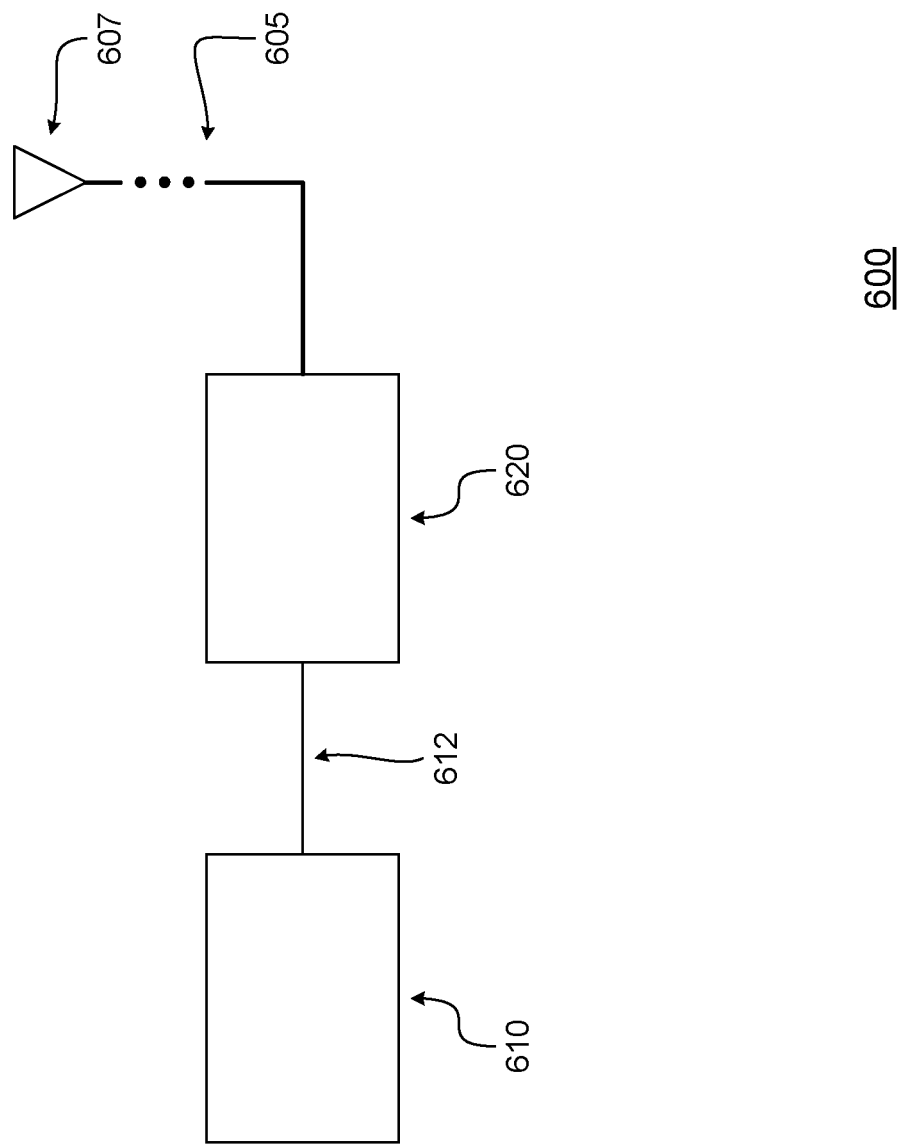
FIG. 6 illustrates hardware processing circuitries for an eNB for determining a PT-RS presence, in accordance with some embodiments of the disclosure.

FIG. 6 illustrates hardware processing circuitries for an eNB for determining a PT-RS presence, in accordance with some embodiments of the disclosure. With reference to FIG. 4, an eNB may include various hardware processing circuitries discussed herein (such as hardware processing circuitry 600 of FIG. 6), which may in turn comprise logic devices and/or circuitry operable to perform various operations. For example, in FIG. 4, eNB 410 (or various elements or components therein, such as hardware processing circuitry 420, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 416 (and/or one or more other processors which eNB 410 may comprise), memory 418, and/or other elements or components of eNB 410 (which may include hardware processing circuitry 420) may be arranged to perform the operations of these hardware processing circuitries, such as operations described herein with reference to devices and circuitry within these hardware processing circuitries. In some embodiments, processor 416 (and/or one or more other processors which eNB 410 may comprise) may be a baseband processor.

Returning to FIG. 6, an apparatus of eNB 410 (or another eNB or base station), which may be operable to communicate with one or more UEs on a wireless network, may comprise hardware processing circuitry 600. In some embodiments, hardware processing circuitry 600 may comprise one or more antenna ports 605 operable to provide various transmissions over a wireless communication channel (such as wireless communication channel 450). Antenna ports 605 may be coupled to one or more antennas 607 (which may be antennas 405). In some embodiments, hardware processing circuitry 600 may incorporate antennas 607, while in other embodiments, hardware processing circuitry 600 may merely be coupled to antennas 607.

Antenna ports 605 and antennas 607 may be operable to provide signals from an eNB to a wireless communications channel and/or a UE, and may be operable to provide signals from a UE and/or a wireless communications channel to an eNB. For example, antenna ports 605 and antennas 607 may be operable to provide transmissions from eNB 410 to wireless communication channel 450 (and from there to UE 430, or to another UE). Similarly, antennas 607 and antenna ports 605 may be operable to provide transmissions from a wireless communication channel 450 (and beyond that, from UE 430, or another UE) to eNB 410.

Hardware processing circuitry 600 may comprise various circuitries operable in accordance with the various embodiments discussed herein. With reference to FIG. 6, hardware processing circuitry 600 may comprise a first circuitry 610 and/or a second circuitry 620.

In various embodiments, first circuitry 610 may be operable to establish a use of a PT-RS and a density of the PT-RS. Second circuitry 620 may be operable to generate the PT-RS. Second circuitry 620 may also be operable to generate a transmission in a MUST operation in accordance with the PT-RS. First circuitry 610 may be operable to provide information regarding the presence and/or density of the PT-RS to second circuitry 620 via an interface 612. Hardware processing circuitry 600 may also comprise an interface for sending the PT-RS and the transmission in the MUST operation to a transmission circuitry.

In a variety of embodiments, at least one of the use of the PT-RS and the density of the PT-RS may be indicated at least in part by a Far-UE indicator. In some embodiments, the Far-UE indicator may be carried by a DCI transmission and/or a higher-layer signaling transmission. For some embodiments, the Far-UE indicator may be jointly coded with an MCS indicator. In some embodiments, the MCS indicator may be carried by a DCI transmission. For some embodiments, the Far-UE indicator may be indicated by a search space indicator. In some embodiments, the search space indicator may be a CCE index. For some embodiments, the Far-UE indicator may be indicated by a DM-RS scrambling.

In a variety of embodiments, second circuitry 620 may also be operable to generate a DCI transmission carrying an amplitude weight alpha indicator for PT-RS. For some embodiments, at least one of the use of the PT-RS and the density of the PT-RS may be indicated by the amplitude weight alpha indicator for PT-RS. In some embodiments, at least one of the use of the PT-RS and the density of the PT-RS may be indicated at least in part by a Far-UE indicator. The Far-UE indicator may be indicated by the amplitude weight alpha indicator for PT-RS.

In a variety of embodiments, second circuitry 620 may also be operable to generate a DCI transmission carrying an MCS or SNR offset. In some embodiments, at least one of the use of the PT-RS and the density of the PT-RS is indicated at least in part by the MCS or SNR offset. For some embodiments, at least one of a PT-RS time pattern and a PT-RS frequency pattern may be indicated at least in part by the MCS or SNR offset. In some embodiments, one or more of a PT-RS time pattern and a PT-RS frequency pattern may be indicated at least in part by a range of offsets into which the MCS or SNR offset falls. For some embodiments, the range of offsets may be carried by a higher-layer signaling transmission. In some embodiments, one or more of the PT-RS time pattern and the PT-RS frequency pattern may be predetermined, or carried by a higher-layer signaling transmission.

In some embodiments, first circuitry 610 and/or second circuitry 620 may be implemented as separate circuitries. In other embodiments, first circuitry 610 and/or second circuitry 620 may be combined and implemented together in a circuitry without altering the essence of the embodiments.

Figure 7:
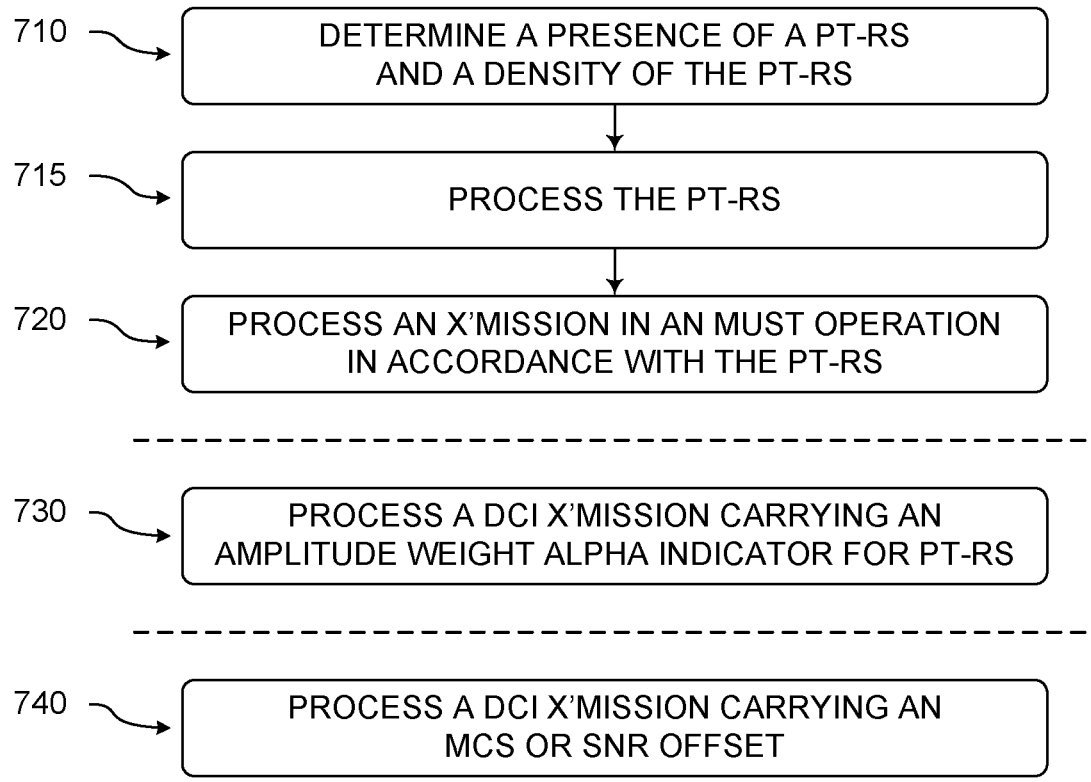
FIG. 7 illustrates methods for a UE for determining a PT-RS presence, in accordance with some embodiments of the disclosure.

FIG. 7 illustrates methods for a UE for determining a PT-RS presence, in accordance with some embodiments of the disclosure. With reference to FIG. 4, methods that may relate to UE 430 and hardware processing circuitry 440 are discussed herein. Although the actions in method 700 of FIG. 7 are shown in a particular order, the order of the actions can be modified. Thus, the illustrated embodiments can be performed in a different order, and some actions may be performed in parallel. Some of the actions and/or operations listed in FIG. 7 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 430 and/or hardware processing circuitry 440 to perform an operation comprising the methods of FIG. 7. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 7.

Returning to FIG. 7, various methods may be in accordance with the various embodiments discussed herein. A method 700 may comprise a determining 710, a processing 715, and a processing 720. Method 700 may also comprise a processing 730 and/or a processing 740.

In determining 710, a presence of a PT-RS and a density of the PT-RS may be determined. In processing 715, the PT-RS may be processed. In some embodiments, processing 715 may comprise analyzing the PT-RS, and/or determining one or more of a CPE, an ICI, and/or a phase noise of the PT-RS. In processing 720, a transmission in a MUST operation may be processed in accordance with the PT-RS. In some embodiments, processing 720 may comprise using a CPE, an ICI, and/or a phase noise determined in processing 715 to compensate for a CPE, an ICI, and/or a phase noise of the transmission in the MUST operation.

In a variety of embodiments, at least one of the presence of the PT-RS and the density of the PT-RS may be determined at least in part by a Far-UE indicator. In some embodiments, the Far-UE indicator may be carried by a DCI transmission and/or a higher-layer signaling transmission. For some embodiments, the Far-UE indicator may be jointly coded with an MCS indicator. In some embodiments, the MCS indicator may be carried by a DCI transmission. For some embodiments, the Far-UE indicator may be determined based upon a search space indicator. In some embodiments, the search space indicator may be a CCE index. For some embodiments, the Far-UE indicator may be determined based upon a DM-RS scrambling.

In a variety of embodiments, in processing 730, a DCI transmission carrying an amplitude weight alpha indicator for PT-RS may be processed. For some embodiments, at least one of the presence of the PT-RS and the density of the PT-RS may be determined based upon the amplitude weight alpha indicator for PT-RS. In some embodiments, at least one of the presence of the PT-RS and the density of the PT-RS may be determined at least in part by a Far-UE indicator. The Far-UE indicator may be determined based upon the amplitude weight alpha indicator for PT-RS.

In processing 740, a DCI transmission carrying an MCS or SNR offset may be processed. In some embodiments, at least one of the presence of the PT-RS and the density of the PT-RS may be determined at least in part by the MCS or SNR offset. For some embodiments, at least one of a PT-RS time pattern and a PT-RS frequency pattern may be determined at least in part by the MCS or SNR offset. In some embodiments, one or more of a PT-RS time pattern and a PT-RS frequency pattern may be determined at least in part by a range of offsets into which the MCS or SNR offset falls. For some embodiments, the range of offsets may be carried by a higher-layer signaling transmission. In some embodiments, one or more of the PT-RS time pattern and the PT-RS frequency pattern may be predetermined, or carried by a higher-layer signaling transmission.

Figure 8:
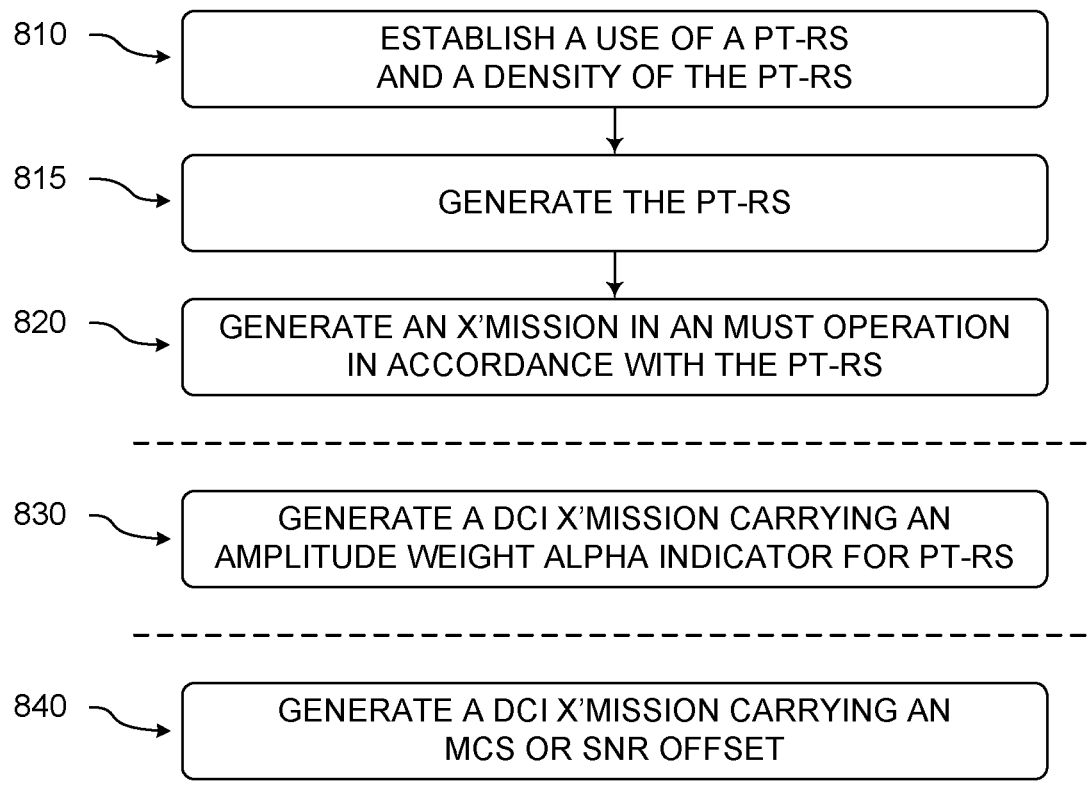
FIG. 8 illustrates methods for an eNB for determining a PT-RS presence, in accordance with some embodiments of the disclosure.

FIG. 8 illustrates methods for an eNB for determining a PT-RS presence, in accordance with some embodiments of the disclosure. With reference to FIG. 4, various methods that may relate to eNB 410 and hardware processing circuitry 420 are discussed herein. Although the actions in method 800 of FIG. 8 are shown in a particular order, the order of the actions can be modified. Thus, the illustrated embodiments can be performed in a different order, and some actions may be performed in parallel. Some of the actions and/or operations listed in FIG. 8 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 410 and/or hardware processing circuitry 420 to perform an operation comprising the methods of FIG. 8. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 8.

Returning to FIG. 8, various methods may be in accordance with the various embodiments discussed herein. A method 800 may comprise an establishing 810, a generating 815, and a generating 820. Method 800 may also comprise a generating 830 and/or a generating 840.

In establishing 810, a use of a PT-RS and a density of the PT-RS. In generating 815, the PT-RS may be generated. In generating 820, a transmission in a MUST operation may be generated in accordance with the PT-RS.

In a variety of embodiments, at least one of the use of the PT-RS and the density of the PT-RS may be indicated at least in part by a Far-UE indicator. In some embodiments, the Far-UE indicator may be carried by a DCI transmission and/or a higher-layer signaling transmission. For some embodiments, the Far-UE indicator may be jointly coded with an MCS indicator. In some embodiments, the MCS indicator may be carried by a DCI transmission. For some embodiments, the Far-UE indicator may be indicated by a search space indicator. In some embodiments, the search space indicator may be a CCE index. For some embodiments, the Far-UE indicator may be indicated by a DM-RS scrambling.

In a variety of embodiments, in generating 830, a DCI transmission carrying an amplitude weight alpha indicator for PT-RS may be generated. For some embodiments, at least one of the use of the PT-RS and the density of the PT-RS may be indicated by the amplitude weight alpha indicator for PT-RS. In some embodiments, at least one of the use of the PT-RS and the density of the PT-RS may be indicated at least in part by a Far-UE indicator. The Far-UE indicator may be indicated by the amplitude weight alpha indicator for PT-RS.

In a variety of embodiments, in generating 840, a DCI transmission carrying an MCS or SNR offset may be generated. In some embodiments, at least one of the use of the PT-RS and the density of the PT-RS is indicated at least in part by the MCS or SNR offset. For some embodiments, at least one of a PT-RS time pattern and a PT-RS frequency pattern may be indicated at least in part by the MCS or SNR offset. In some embodiments, one or more of a PT-RS time pattern and a PT-RS frequency pattern may be indicated at least in part by a range of offsets into which the MCS or SNR offset falls. For some embodiments, the range of offsets may be carried by a higher-layer signaling transmission. In some embodiments, one or more of the PT-RS time pattern and the PT-RS frequency pattern may be predetermined, or carried by a higher-layer signaling transmission.

Figure 9:
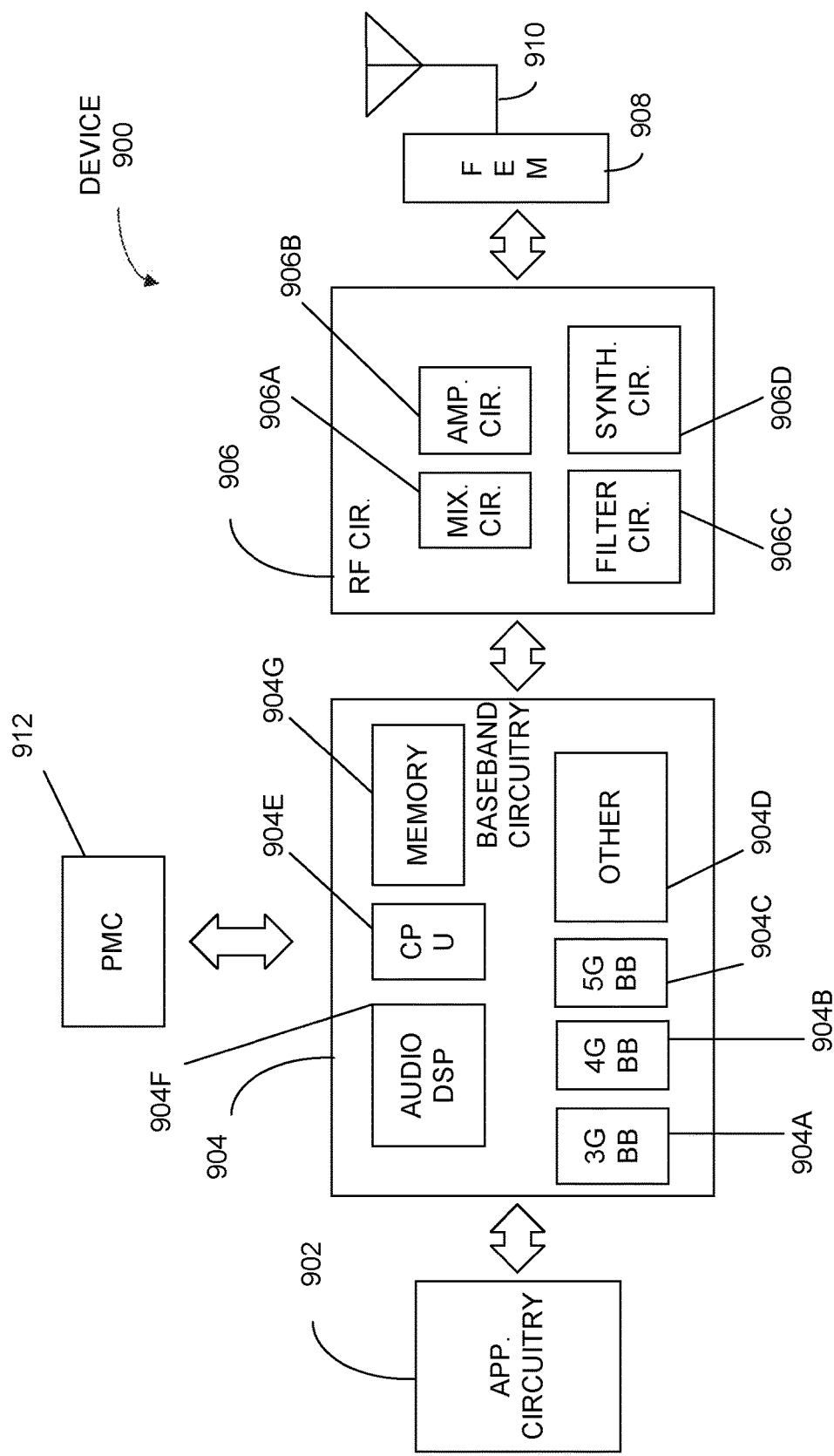
FIG. 9 illustrates example components of a device, in accordance with some embodiments of the disclosure.

FIG. 9 illustrates example components of a device, in accordance with some embodiments of the disclosure. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include less elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), and so on). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, and so on. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904F. The audio DSP(s) 904F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, and so on to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906A, amplifier circuitry 906B and filter circuitry 906C. In some embodiments, the transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by filter circuitry 906C.

In some embodiments, the mixer circuitry 906A of the receive signal path and the mixer circuitry 906A of the transmit signal path may include two or more mixers and may be arranged for quadrature downconversion and upconversion, respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct downconversion and direct upconversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906D of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device is included in a UE. The PMC 912 may increase the power conversion efficiency while providing desirable implementation size and heat dissipation characteristics.

While FIG. 9 shows the PMC 912 coupled only with the baseband circuitry 904. However, in other embodiments, the PMC 912 may be additionally or alternatively coupled with, and perform similar power management operations for, other components such as, but not limited to, application circuitry 902, RF circuitry 906, or FEM 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, and so on. The device 900 goes into a very low power state and it performs paging where again it periodically wakes up to listen to the network and then powers down again. The device 900 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used execute Layer 3, Layer 2, or Layer 1 functionality, while processors of the application circuitry 904 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
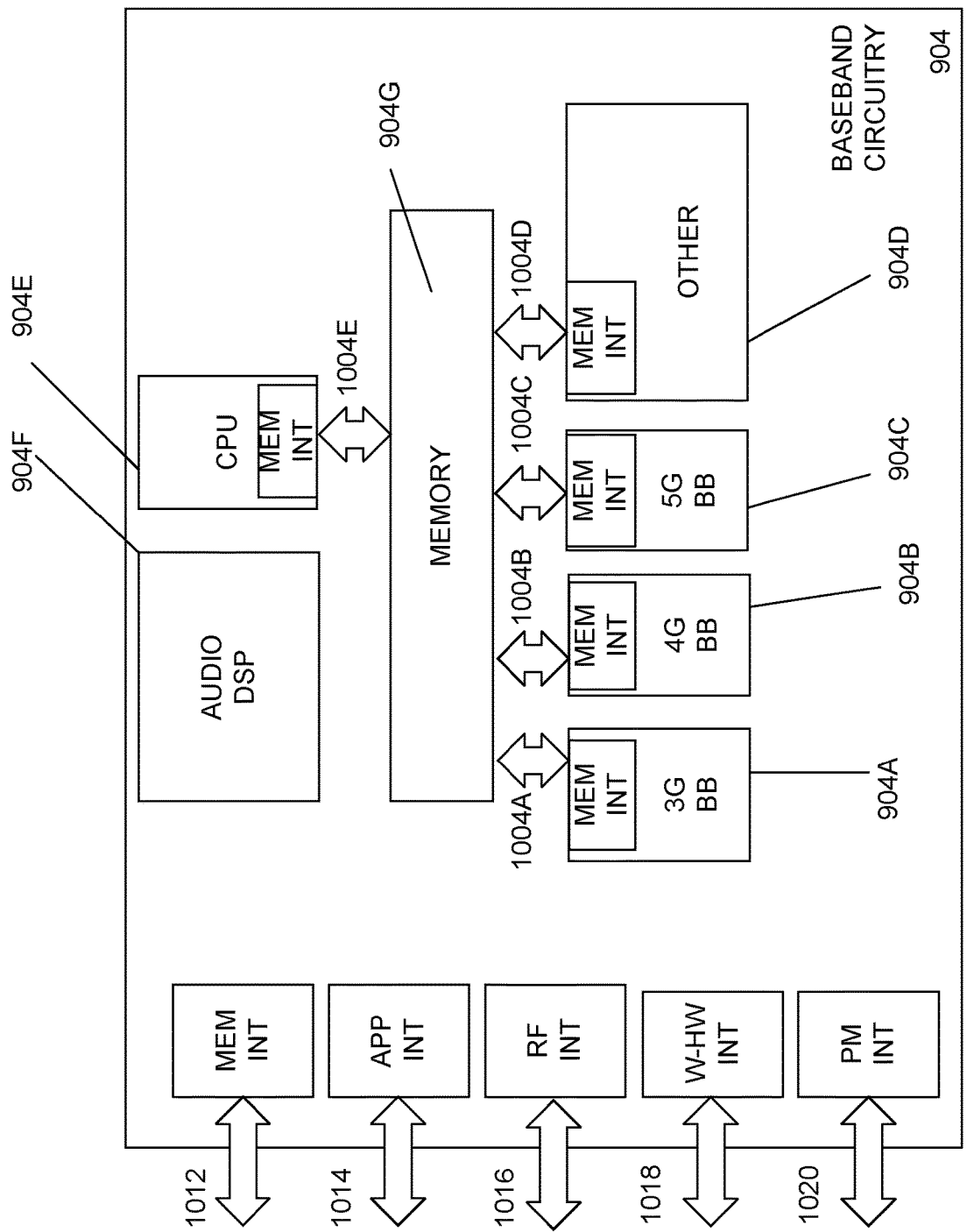
FIG. 10 illustrates example interfaces of baseband circuitry, in accordance with some embodiments of the disclosure.

FIG. 10 illustrates example interfaces of baseband circuitry, in accordance with some embodiments of the disclosure. As discussed above, the baseband circuitry 904 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with an Evolved Node B (eNB) on a wireless network, comprising: one or more processors to: determine a presence of a Phase Tracking Reference Signal (PT-RS) and a density of the PT-RS; process the PT-RS; and process a transmission in a Multi-User Superposition Transmission (MUST) operation in accordance with the PT-RS, and an interface for receiving the PT-RS and the transmission in the MUST operation from a receiving circuitry.

In example 2, the apparatus of example 1, wherein at least one of the presence of the PT-RS and the density of the PT-RS is determined at least in part by a Far-UE indicator.

In example 3, the apparatus of example 2, wherein the Far-UE indicator is carried by one of: a Downlink Control Information (DCI) transmission; or a higher-layer signaling transmission.

In example 4, the apparatus of any of examples 2 through 3, wherein the Far-UE indicator is jointly coded with a Modulation and Coding Scheme (MCS) indicator.

In example 5, the apparatus of example 4, wherein the MCS indicator is carried by a Downlink Control Information (DCI) transmission.

In example 6, the apparatus of any of examples 2 through 5, wherein the Far-UE indicator is determined based upon a search space indicator.

In example 7, the apparatus of example 6, wherein the search space indicator is a Control Channel Element (CCE) index.

In example 8, the apparatus of any of examples 2 through 7, wherein the Far-UE indicator is determined based upon a Demodulation Reference Signal (DM-RS) scrambling.

In example 9, the apparatus of any of examples 1 through 8, wherein the one or more processors are to: process a Downlink Control Information (DCI) transmission carrying an amplitude weight alpha indicator for PT-RS.

In example 10, the apparatus of example 9, wherein at least one of the presence of the PT-RS and the density of the PT-RS is determined based upon the amplitude weight alpha indicator for PT-RS.

In example 11, the apparatus of any of examples 9 through 10, wherein at least one of the presence of the PT-RS and the density of the PT-RS is determined at least in part by a Far-UE indicator; and wherein the Far-UE indicator is determined based upon the amplitude weight alpha indicator for PT-RS.

In example 12, the apparatus of any of examples 1 through 11, wherein the one or more processors are to: process a Downlink Control Information (DCI) transmission carrying a Modulation and Coding Scheme (MCS) or Signal-to-Noise Ratio (SNR) offset.

In example 13, the apparatus of example 12, wherein at least one of the presence of the PT-RS and the density of the PT-RS is determined at least in part by the MCS or SNR offset.

In example 14, the apparatus of example 13, wherein at least one of a PT-RS time pattern and a PT-RS frequency pattern is determined at least in part by the MCS or SNR offset.

In example 15, the apparatus of any of examples 13 through 14, wherein one or more of a PT-RS time pattern and a PT-RS frequency pattern is determined at least in part by a range of offsets into which the MCS or SNR offset falls.

In example 16, the apparatus of example 15, wherein the range of offsets is carried by a higher-layer signaling transmission.

In example 17, the apparatus of any of examples 15 through 16, wherein one or more of the PT-RS time pattern and the PT-RS frequency pattern are predetermined, or carried by a higher-layer signaling transmission. Example 18 provides a User Equipment (UE) device comprising an application processor, a memory, one or more antennas, a wireless interface for allowing the application processor to communicate with another device, and a touch-screen display, the UE device including the apparatus of any of examples 1 through 17. Example 19 provides machine readable storage media having machine executable instructions that, when executed, cause one or more processors of a User Equipment (UE) operable to communicate with an Evolved Node-B (eNB) on a wireless network to perform an operation comprising: determine a presence of a Phase Tracking Reference Signal (PT-RS) and a density of the PT-RS; process the PT-RS; and process a transmission in a Multi-User Superposition Transmission (MUST) operation in accordance with the PT-RS.

In example 20, the machine readable storage media of example 19, wherein at least one of the presence of the PT-RS and the density of the PT-RS is determined at least in part by a Far-UE indicator.

In example 21, the machine readable storage media of example 20, wherein the Far-UE indicator is carried by one of: a Downlink Control Information (DCI) transmission; or a higher-layer signaling transmission.

In example 22, the machine readable storage media of any of examples 20 through 21, wherein the Far-UE indicator is jointly coded with a Modulation and Coding Scheme (MCS) indicator.

In example 23, the machine readable storage media of example 22, wherein the MCS indicator is carried by a Downlink Control Information (DCI) transmission.

In example 24, the machine readable storage media of any of examples 20 through 23, wherein the Far-UE indicator is determined based upon a search space indicator.

In example 25, the machine readable storage media of example 24, wherein the search space indicator is a Control Channel Element (CCE) index.

In example 26, the machine readable storage media of any of examples 20 through 25, wherein the Far-UE indicator is determined based upon a Demodulation Reference Signal (DM-RS) scrambling.

In example 27, the machine readable storage media of any of examples 19 through 26, the operation comprising: process a Downlink Control Information (DCI) transmission carrying an amplitude weight alpha indicator for PT-RS.

In example 28, the machine readable storage media of example 27, wherein at least one of the presence of the PT-RS and the density of the PT-RS is determined based upon the amplitude weight alpha indicator for PT-RS.

In example 29, the machine readable storage media of any of examples 27 through 28, wherein at least one of the presence of the PT-RS and the density of the PT-RS is determined at least in part by a Far-UE indicator; and wherein the Far-UE indicator is determined based upon the amplitude weight alpha indicator for PT-RS.

In example 30, the machine readable storage media of any of examples 19 through 29, the operation comprising: process a Downlink Control Information (DCI) transmission carrying a Modulation and Coding Scheme (MCS) or Signal-to-Noise Ratio (SNR) offset.

In example 31, the machine readable storage media of example 30, wherein at least one of the presence of the PT-RS and the density of the PT-RS is determined at least in part by the MCS or SNR offset.

In example 32, the machine readable storage media of example 31, wherein at least one of a PT-RS time pattern and a PT-RS frequency pattern is determined at least in part by the MCS or SNR offset.

In example 33, the machine readable storage media of any of examples 31 through 32, wherein one or more of a PT-RS time pattern and a PT-RS frequency pattern is determined at least in part by a range of offsets into which the MCS or SNR offset falls.

In example 34, the machine readable storage media of example 33, wherein the range of offsets is carried by a higher-layer signaling transmission.

In example 35, the machine readable storage media of any of examples 33 through 34, wherein one or more of the PT-RS time pattern and the PT-RS frequency pattern are predetermined, or carried by a higher-layer signaling transmission. Example 36 provides an apparatus of an Evolved Node B (eNB) operable to communicate with a User Equipment (UE) on a wireless network, comprising: one or more processors to: establish a use of a Phase Tracking Reference Signal (PT-RS) and a density of the PT-RS; generate the PT-RS; and generate a transmission in a Multi-User Superposition Transmission (MUST) operation in accordance with the PT-RS, and an interface for sending the PT-RS and the transmission in the MUST operation to a transmission circuitry.

In example 37, the apparatus of example 36, wherein at least one of the use of the PT-RS and the density of the PT-RS is indicated at least in part by a Far-UE indicator.

In example 38, the apparatus of example 37, wherein the Far-UE indicator is carried by one of: a Downlink Control Information (DCI) transmission; or a higher-layer signaling transmission.

In example 39, the apparatus of any of examples 37 through 38, wherein the Far-UE indicator is jointly coded with a Modulation and Coding Scheme (MCS) indicator.

In example 40, the apparatus of example 39, wherein the MCS indicator is carried by a Downlink Control Information (DCI) transmission.

In example 41, the apparatus of any of examples 37 through 40, wherein the Far-UE indicator is indicated by a search space indicator.

In example 42, the apparatus of example 41, wherein the search space indicator is a Control Channel Element (CCE) index.

In example 43, the apparatus of any of examples 37 through 42, wherein the Far-UE indicator is indicated by a Demodulation Reference Signal (DM-RS) scrambling.

In example 44, the apparatus of any of examples 36 through 43, wherein the one or more processors are to: generate a Downlink Control Information (DCI) transmission carrying an amplitude weight alpha indicator for PT-RS.

In example 45, the apparatus of example 44, wherein at least one of the use of the PT-RS and the density of the PT-RS is indicated by the amplitude weight alpha indicator for PT-RS.

In example 46, the apparatus of any of examples 44 through 45, wherein at least one of the use of the PT-RS and the density of the PT-RS is indicated at least in part by a Far-UE indicator; and wherein the Far-UE indicator is indicated by the amplitude weight alpha indicator for PT-RS.

In example 47, the apparatus of any of examples 36 through 46, wherein the one or more processors are to: generate a Downlink Control Information (DCI) transmission carrying a Modulation and Coding Scheme (MCS) or Signal-to-Noise Ratio (SNR) offset.

In example 48, the apparatus of example 47, wherein at least one of the use of the PT-RS and the density of the PT-RS is indicated at least in part by the MCS or SNR offset.

In example 49, the apparatus of example 48, wherein at least one of a PT-RS time pattern and a PT-RS frequency pattern is indicated at least in part by the MCS or SNR offset.

In example 50, the apparatus of any of examples 48 through 49, wherein one or more of a PT-RS time pattern and a PT-RS frequency pattern is indicated at least in part by a range of offsets into which the MCS or SNR offset falls.

In example 51, the apparatus of example 50, wherein the range of offsets is carried by a higher-layer signaling transmission.

In example 52, the apparatus of any of examples 50 through 51, wherein one or more of the PT-RS time pattern and the PT-RS frequency pattern are predetermined, or carried by a higher-layer signaling transmission. Example 53 provides an Evolved Node B (eNB) device comprising an application processor, a memory, one or more antenna ports, and an interface for allowing the application processor to communicate with another device, the eNB device including the apparatus of any of examples 36 through 52. Example 54 provides machine readable storage media having machine executable instructions that, when executed, cause one or more processors of an Evolved Node B (eNB) operable to communicate with a User Equipment (UE) on a wireless network to perform an operation comprising: establish a use of a Phase Tracking Reference Signal (PT-RS) and a density of the PT-RS; generate the PT-RS; and generate a transmission in a Multi-User Superposition Transmission (MUST) operation in accordance with the PT-RS.

In example 55, the machine readable storage media of example 54, wherein at least one of the use of the PT-RS and the density of the PT-RS is indicated at least in part by a Far-UE indicator.

In example 56, the machine readable storage media of example 55, wherein the Far-UE indicator is carried by one of: a Downlink Control Information (DCI) transmission; or a higher-layer signaling transmission.

In example 57, the machine readable storage media of any of examples 55 through 56, wherein the Far-UE indicator is jointly coded with a Modulation and Coding Scheme (MCS) indicator.

In example 58, the machine readable storage media of example 57, wherein the MCS indicator is carried by a Downlink Control Information (DCI) transmission.

In example 59, the machine readable storage media of any of examples 55 through 58, wherein the Far-UE indicator is indicated by a search space indicator.

In example 60, the machine readable storage media of example 59, wherein the search space indicator is a Control Channel Element (CCE) index.

In example 61, the machine readable storage media of any of examples 55 through 60, wherein the Far-UE indicator is indicated by a Demodulation Reference Signal (DM-RS) scrambling.

In example 62, the machine readable storage media of any of examples 54 through 61, the operation comprising: generate a Downlink Control Information (DCI) transmission carrying an amplitude weight alpha indicator for PT-RS.

In example 63, the machine readable storage media of example 62, wherein at least one of the use of the PT-RS and the density of the PT-RS is indicated by the amplitude weight alpha indicator for PT-RS.

In example 64, the machine readable storage media of any of examples 62 through 63, wherein at least one of the use of the PT-RS and the density of the PT-RS is indicated at least in part by a Far-UE indicator; and wherein the Far-UE indicator is indicated by the amplitude weight alpha indicator for PT-RS.

In example 65, the machine readable storage media of any of examples 54 through 64, the operation comprising: generate a Downlink Control Information (DCI) transmission carrying a Modulation and Coding Scheme (MCS) or Signal-to-Noise Ratio (SNR) offset.

In example 66, the machine readable storage media of example 65, wherein at least one of the use of the PT-RS and the density of the PT-RS is indicated at least in part by the MCS or SNR offset.

In example 67, the machine readable storage media of example 66, wherein at least one of a PT-RS time pattern and a PT-RS frequency pattern is indicated at least in part by the MCS or SNR offset.

In example 68, the machine readable storage media of any of examples 66 through 67, wherein one or more of a PT-RS time pattern and a PT-RS frequency pattern is indicated at least in part by a range of offsets into which the MCS or SNR offset falls.

In example 69, the machine readable storage media of example 68, wherein the range of offsets is carried by a higher-layer signaling transmission.

In example 70, the machine readable storage media of any of examples 68 through 69, wherein one or more of the PT-RS time pattern and the PT-RS frequency pattern are predetermined, or carried by a higher-layer signaling transmission.

In example 71, the apparatus of any of examples 1 through 17, and 36 through 52, wherein the one or more processors comprise a baseband processor.

In example 72, the apparatus of any of examples 1 through 17, and 36 through 52, comprising a memory for storing instructions, the memory being coupled to the one or more processors.

In example 73, the apparatus of any of examples 1 through 17, and 36 through 52, comprising a transceiver circuitry for at least one of: generating transmissions, encoding transmissions, processing transmissions, or decoding transmissions.

In example 74, the apparatus of any of examples 1 through 17, and 36 through 52, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A User Equipment (UE) operable to communicate with a base station (BS) on a wireless network, comprising:
    one or more processors to:
        determine a presence of a Phase Tracking Reference Signal (PT-RS) and a density of the PT-RS, wherein at least one of the presence of the PT-RS or the density of the PT-RS is determined based at least in part on a Far-UE indicator;
        process the PT-RS; and
        process a transmission in a Multi-User Superposition Transmission (MUST) operation in accordance with the PT-RS, and
    an interface for receiving the PT-RS and the transmission in the MUST operation from a receiving circuitry.

2. The UE of claim 1,
    wherein the Far-UE indicator is carried by one of: a Downlink Control Information (DCI) transmission; or a higher-layer signaling transmission.

3. The UE of claim 1,
    wherein the Far-UE indicator is jointly coded with a Modulation and Coding Scheme (MCS) indicator.

4. The UE of claim 3,
    wherein the MCS indicator is carried by a Downlink Control Information (DCI) transmission.

5. The UE of claim 1,
    wherein the Far-UE indicator is determined based upon a search space indicator.

6. The UE of claim 1, wherein the one or more processors determines the Far-UE indicator based on an amplitude weight index carried by a Downlink Control Information (DCI) transmission.

7. Machine readable storage media having machine executable instructions that, when executed, cause one or more processors of a User Equipment (UE) operable to communicate with a base station (BS) on a wireless network to perform an operation comprising:
    determine a presence of a Phase Tracking Reference Signal (PT-RS) and a density of the PT-RS, wherein at least one of the presence of the PT-RS or the density of the PT-RS is determined based at least in part on a Far-UE indicator;
    process the PT-RS; and
    process a transmission in a Multi-User Superposition Transmission (MUST) operation in accordance with the PT-RS.

8. The machine readable storage media of claim 7,
    wherein the Far-UE indicator is carried by one of: a Downlink Control Information (DCI) transmission; or a higher-layer signaling transmission.

9. The machine readable storage media of claim 7,
    wherein the Far-UE indicator is jointly coded with a Modulation and Coding Scheme (MCS) indicator.

10. The machine readable storage media of claim 9,
    wherein the MCS indicator is carried by a Downlink Control Information (DCI) transmission.

11. The machine readable storage media of claim 7,
    wherein the Far-UE indicator is determined based upon a search space indicator.

12. The machine readable storage media of claim 7, wherein the one or more processors further perform the operation of determining the Far-UE indicator based on an amplitude weight index carried by a Downlink Control Information (DCI) transmission.

13. A base station (BS) operable to communicate with a User Equipment (UE) on a wireless network, comprising:
    one or more processors to:
        establish a use of a Phase Tracking Reference Signal (PT-RS) and a density of the PT-RS, wherein at least one of the use of the PT-RS or the density of the PT-RS is indicated at least in part by a Far-UE indicator;
        generate the PT-RS; and
        generate a transmission in a Multi-User Superposition Transmission (MUST) operation in accordance with the PT-RS, and
    an interface for sending the PT-RS and the transmission in the MUST operation to a transmission circuitry.

14. The BS of claim 13,
    wherein the Far-UE indicator is carried by one of: a Downlink Control Information (DCI) transmission; or a higher-layer signaling transmission.

15. The BS of claim 13,
    wherein the Far-UE indicator is jointly coded with a Modulation and Coding Scheme (MCS) indicator.

16. The BS of claim 15,
    wherein the MCS indicator is carried by a Downlink Control Information (DCI) transmission.

17. The BS of claim 13,
    wherein the Far-UE indicator is indicated by a search space indicator.

18. The BS of claim 13, wherein the one or more processors determines the Far-UE indicator based on an amplitude weight index carried by a Downlink Control Information (DCI) transmission.

19. Machine readable storage media having machine executable instructions that, when executed, cause one or more processors of a base station (BS) operable to communicate with a User Equipment (UE) on a wireless network to perform an operation comprising:
    establish a use of a Phase Tracking Reference Signal (PT-RS) and a density of the PT-RS, wherein at least one of the use of the PT-RS or the density of the PT-RS is indicated at least in part by a Far-UE indicator;
    generate the PT-RS; and generate a transmission in a Multi-User Superposition Transmission (MUST) operation in accordance with the PT-RS.

20. The machine readable storage media of claim 19, wherein the Far-UE indicator is carried by one of: a Downlink Control Information (DCI) transmission; or a higher-layer signaling transmission.

21. The machine readable storage media of claim 19, wherein the Far-UE indicator is jointly coded with a Modulation and Coding Scheme (MCS) indicator.

22. The machine readable storage media of claim 21, wherein the MCS indicator is carried by a Downlink Control Information (DCI) transmission.

23. The machine readable storage media of claim 19, wherein the Far-UE indicator is indicated by a search space indicator.

24. The machine readable storage media of claim 19, wherein the one or more processors further perform the operation of determining the Far-UE indicator based on an amplitude weight index carried by a Downlink Control Information (DCI) transmission.

\* \* \* \* \*